J. W. LINKHART.
AUTOMOBILE BUMPER.
APPLICATION FILED SEPT. 4, 1915.
1,175,780.
Patented Mar. 14, 1916.
2 SHEETS—SHEET 1.
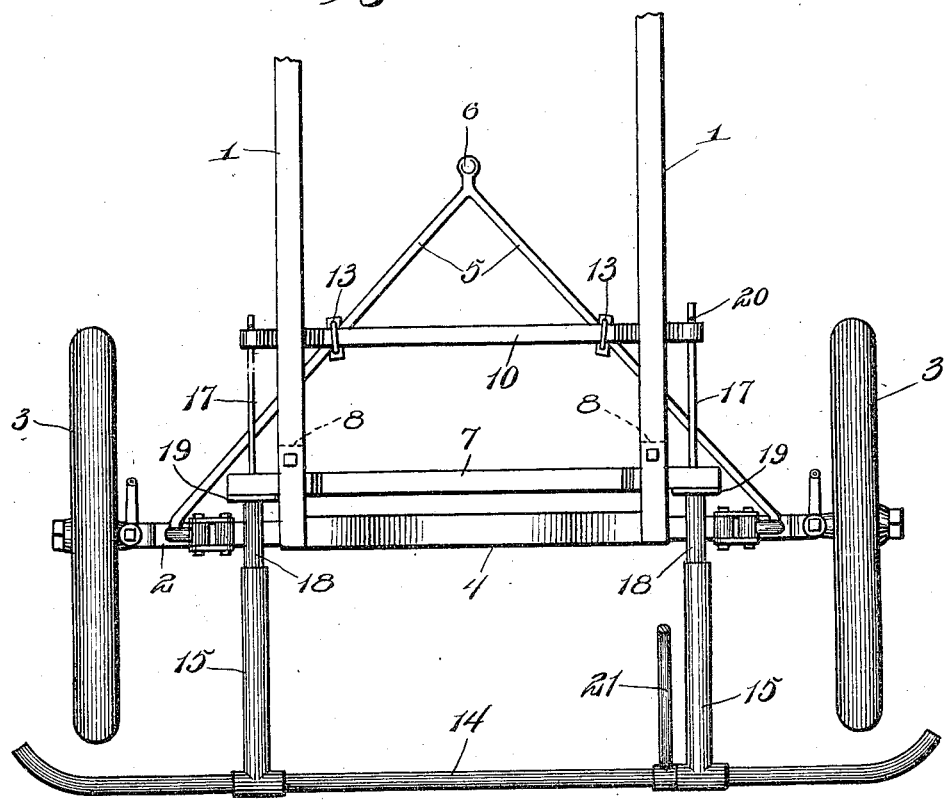
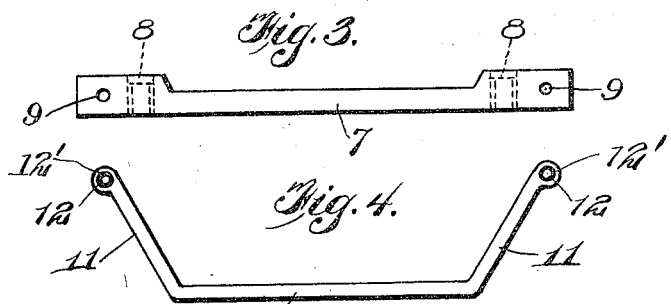
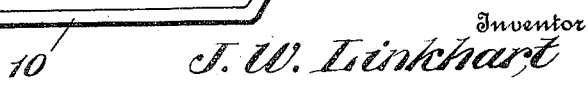
Witnesses
J. R. Heinrichs.
P. M. Smith.
Inventor
J. W. Linkhart
By Victor J. Evans
Attorney J. W. LINKHART.
AUTOMOBILE BUMPER.
APPLICATION FILED SEPT. 4, 1915.
1,175,780.
Patented Mar. 14, 1916.
2 SHEETS—SHEET 2.
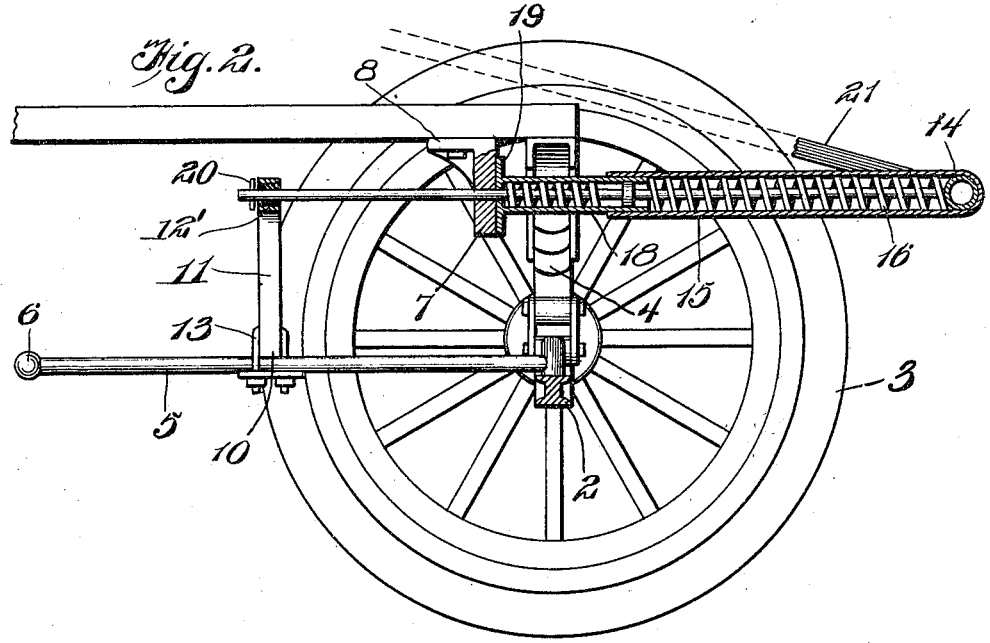
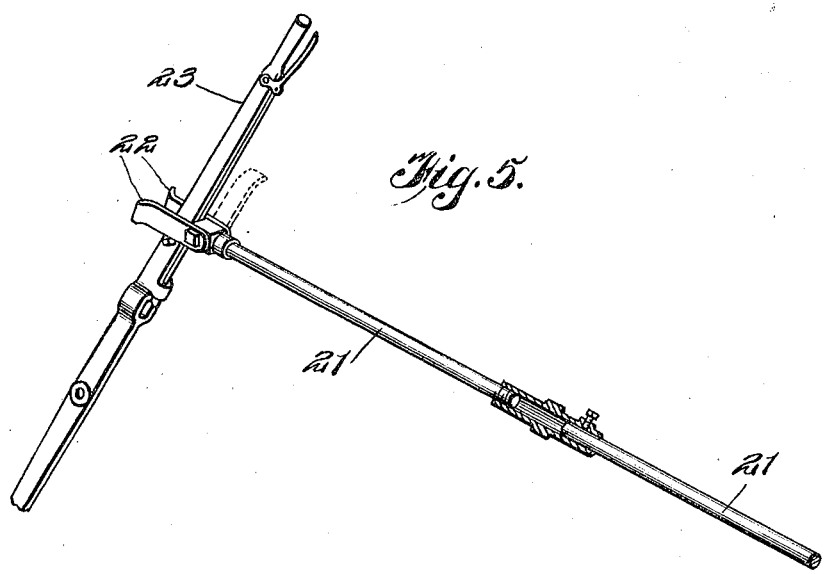
Inventor
J. W. Linkhart
By Victor J. Evans
Attorney
Witnesses
J. R. Heinrichs
P. M. Smith

UNITED STATES PATENT OFFICE.

JOHN W. LINKHART, OF NORTH VERNON, INDIANA.

AUTOMOBILE-BUMPER.

1,175,780. Specification of Letters Patent. Patented Mar. 14, 1916.

Application filed September 4, 1915. Serial No. 3,041.

*To all whom it may concern:*

Be it known that I, JOHN W. LINKHART, a citizen of the United States, residing at North Vernon, in the county of Jennings and State of Indiana, have invented new and useful Improvements in Automobile-Bumpers, of which the following is a specification.

This invention relates to bumpers or safety devices for use on automobiles, motor trucks, and all kinds of motor propelled vehicles, the broad object of the invention being to produce a safety device of the class referred to which will simultaneously cushion blows or shocks received by the forward end of the machine and also effect an application of the brake or brakes, the device acting additionally to chock the front wheels of the machine. In this way the machine is gradually brought to a standstill without injury either to the machine or person or object which the device comes into contact with.

A further object of the invention is to provide a novel form of connection between the pilot bar of the bumper and the hand lever by means of which the brake or brakes are applied, the connection referred to being of such a character as not to interfere with the use of the hand brake lever when the safety device is in its normal position.

With the above and other objects in view, the invention consists in the novel construction, combination, and arrangement, herein fully described, illustrated, and claimed.

In the accompanying drawings:

Figure 1 is a plan view of a sufficient portion of the chassis of an automobile to illustrate the application of the device of this invention thereto. Fig. 2 is a side elevation of the same partly in section. Fig. 3 is a front elevation of the forward guide bar. Fig. 4 is a similar view of the rear guide bar. Fig. 5 is a detail perspective view illustrating the connection between the hand brake lever and the member which coöperates therewith to effect an application of the brakes.

Referring to the drawings, 1 designates the side bars of the chassis of a motor vehicle, 2 the front axle, 3 the front or steering wheels of the machine, 4 the front spring, and 5 the radius rods extending from the front axle back to the universal joint, a portion of which is indicated at 6.

In carrying out the present invention, a front guide bar 7 is fastened by means of lugs 8 and bolts to the front end of the chassis or frame so as to have a fixed relation thereto, said bar 7 being provided adjacent to the opposite extremities thereof with guide openings 9, the purpose of which will presently appear.

Secured to the radius rods 5 in rear of the front guide bar 7 is a rear guide bar 10, the opposite extremities of which are extended upwardly as shown at 11 and provided with eyes or guide openings 12 in line with the guide openings 9 of the front guide bar 7. The rear guide bar 10 is fastened to the radius rods 5 in fixed relation thereto by means of clips 13. Bushings 12' of rubber or soft material in the eyes 12 prevent rattling of the rods 17.

The bumper proper comprises a front or pilot bar 14 which may consist of a suitable length of tubing or gas pipe, said bar being long enough to extend in advance of the front wheels 3 and at any suitable distance therefrom. Secured fixedly at their forward extremities to the fender bar 14 are rearwardly extending tubes 15 forming housings for cushioning springs 16 which are contained within said tubular housings and encircle rods 17 also secured at their forward extremities to the fender bar 14 and extending rearwardly through the tubular housings 15.

The rear ends of the tubular members 15 telescopically slide over tubular guides 18 provided at their rear ends with heads or flanges 19 which bear against the front side of the front guide bar 7, the springs 16 bearing at their rear extremities against the forward extremities of the members 18.

The rods 17 extend through the holes 19 of the front guide bar 7 and also through the eyes or holes 12 of the rear guide bar 10, the rear extremities of the rods 17 being held from escaping in a forward direction by means of pins 20 or their equivalent.

Attached at its forward extremity to the bar 14 is a brake-operating rod 21 provided as to its rear portion with a fork 22 which straddles the brake lever 23 with which the machine is equipped and by means of which the brake or brakes may be applied. In its forward position, the rod 21 does not interfere with the operation by hand of the brake lever 23. When, however, the pilot bar 14 is thrust rearwardly, a corresponding movement is imparted to the rod 21 which thereupon acts against the lever 23 to move the same to brake-applying position. Additional springs may surround the rods 17 within the spring housings 15 so as to supplement the cushioning action of the springs 16 above described.

From the foregoing description taken in connection with the accompanying drawings, it will now be understood that when the motor vehicle comes in contact with either a fixed or movable object or a person, the spring supported pilot bar 14 will greatly relieve the shock both to the machine by which the appliance is carried and also with respect to the object or person struck by the pilot bar.

The device as a whole is particularly valuable in crowded or circumscribed places where traffic is congested by a large number of automobiles, motor trucks, and other vehicles.

The bumper will take up ordinary shocks without applying the brakes but in case of a heavier impact, the pilot bar 14 will be moved rearwardly to an extent sufficient to apply the brakes by coöperation with the hand brake lever 23, the end portions of the pilot bar 14 also coming into braking relation with the tires of the front wheels 3 of the vehicle.

When the vehicle equipped with the device is pushed or otherwise moved away from a fixed object, the fender bar 14 automatically resumes its initial or forward position under the expansive action of the springs contained within the housings 15 and the brake-operating connection 21 is also carried forward thereby leaving the hand brake lever 23 free for use in the usual way.

I claim:

1. The combination with the chassis of a motor vehicle, of a front guide bar secured fixedly to the forward portion of the frame, a rear guide bar fixedly secured to the radius rods, a pilot bar extending transversely of the machine in advance of the front wheels, guiding members extending rearwardly from and supporting said pilot bar, cushioning springs acting to yieldably thrust the pilot bar to the forward limit of its movement, and a thrust rod attached at its forward extremity to said pilot bar and extending rearwardly therefrom and provided as to its rear portion with a fork which straddles the hand brake lever of the vehicle.

2. The combination with the chassis of a motor vehicle, of a front guide bar secured fixedly to the forward portion of the frame, a rear guide bar fixedly secured to the radius rods, a pilot bar extending transversely of the machine in advance of the front wheels, guiding members extending rearwardly from and supporting said pilot bar, cushioning springs acting to yieldably thrust the pilot bar to the forward limit of its movement, a thrust rod attached at its forward extremity to said pilot bar and extending rearwardly therefrom and provided as to its rear portion with a fork which straddles the hand brake lever of the vehicle, each of said guiding members embodying a tubular spring housing having a fixed relation at its forward extremity to the pilot bar, and an inner telescopic member over which said tubular housing is slidable, said inner telescopic member being supported by the forward guide bar.

In testimony whereof I affix my signature in presence of two witnesses.

JOHN W. LINKHART.

Witnesses:
LEWIS C. HUCKLEBERRY,
CHARLES HAMANT.